(12) United States Patent
Hasegawa et al.

(10) Patent No.: US 11,490,566 B2
(45) Date of Patent: Nov. 8, 2022

(54) APPARATUS AND METHOD FOR COOLING LAWNMOWER COMPONENTS

(71) Applicant: Honda Motor Co., Ltd., Tokyo (JP)

(72) Inventors: Toshiyuki Hasegawa, Durham, NC (US); Surender Kumar, Mebane, NC (US); Shivang Desai, Carrboro, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 272 days.

(21) Appl. No.: 16/377,873

(22) Filed: Apr. 8, 2019

(65) Prior Publication Data

US 2020/0315090 A1 Oct. 8, 2020

(51) Int. Cl.

| | |
|---|---|
| *A01D 34/81* | (2006.01) |
| *A01D 34/68* | (2006.01) |
| *A01D 34/78* | (2006.01) |
| *A01D 69/02* | (2006.01) |
| *A01D 34/82* | (2006.01) |
| *A01D 101/00* | (2006.01) |

(52) U.S. Cl.
CPC ......... *A01D 34/81* (2013.01); *A01D 34/6806* (2013.01); *A01D 34/78* (2013.01); *A01D 69/02* (2013.01); *A01D 34/82* (2013.01); *A01D 2101/00* (2013.01)

(58) Field of Classification Search
CPC ........ A01D 34/81; A01D 34/82; A01D 34/37; A01D 34/001; A01D 34/78; A01D 34/58; A01D 2101/00; A01D 69/02; A01D 69/025; A01D 34/63; A01D 34/6806
See application file for complete search history.

(56) References Cited

U.S. PATENT DOCUMENTS

| | | | | |
|---|---|---|---|---|
| 3,500,620 A | * | 3/1970 | Duran .................... | A01D 34/63 56/12.8 |
| 4,711,077 A | * | 12/1987 | Kutsukake ............ | A01D 34/81 56/17.5 |
| 4,944,142 A | | 7/1990 | Sueshige et al. | |
| 5,910,091 A | * | 6/1999 | Iida ........................ | A01D 69/02 56/16.7 |

(Continued)

FOREIGN PATENT DOCUMENTS

| | | |
|---|---|---|
| EP | 2816433 A2 | 12/2014 |
| EP | 2875712 A1 | 5/2015 |

(Continued)

*Primary Examiner* — Thomas B Will
*Assistant Examiner* — Joan D Misa
(74) *Attorney, Agent, or Firm* — Kenealy Vaidya LLP

(57) ABSTRACT

A lawnmower can include a deck, blade, electric motor, battery pack, housing and fan. An air inlet can be located at the front end of the housing and adjacent to the top surface of the deck. The fan can be mounted in the housing and the housing can be configured such that, when the fan operates, air enters the housing air inlet at the front end of the housing, air flowing through the housing air inlet enters the first chamber, air flowing in the first chamber flows through the battery pack, air exiting the first chamber enters the second chamber and flows through the second chamber, air flowing in the second chamber flows through the motor in a direction that extends along the blade axis, and air exiting the motor exits the housing through the at least one air outlet.

20 Claims, 8 Drawing Sheets

(56) References Cited

U.S. PATENT DOCUMENTS

| | | | |
|---|---|---|---|
| 6,658,829 B2 | 12/2003 | Kobayashi et al. | |
| 6,666,008 B2 | 12/2003 | Iida et al. | |
| 6,826,895 B2 | 12/2004 | Iida et al. | |
| 7,540,132 B2* | 6/2009 | Shimada | A01D 34/828 56/11.9 |
| 8,429,885 B2* | 4/2013 | Rosa | B60L 53/80 56/11.9 |
| 8,653,786 B2* | 2/2014 | Baetica | A01D 34/78 320/104 |
| 9,093,868 B2 | 7/2015 | Baxter | |
| 9,288,942 B2 | 3/2016 | Moriguchi et al. | |
| 10,034,429 B2 | 7/2018 | Zheng et al. | |
| 10,111,383 B2* | 10/2018 | Yamaoka | A01D 34/81 |
| 10,188,032 B2* | 1/2019 | Ito | A01D 34/78 |
| 10,485,166 B2* | 11/2019 | Wang | A01D 34/64 |
| 11,140,821 B2* | 10/2021 | Hasegawa | A01D 34/78 |
| 2016/0183451 A1* | 6/2016 | Conrad | A01D 34/66 56/10.2 R |
| 2018/0146620 A1* | 5/2018 | Uchimi | A01D 69/02 |
| 2020/0177052 A1* | 6/2020 | Fujiwara | H02K 11/33 |
| 2020/0196522 A1* | 6/2020 | Feng | A01D 75/18 |
| 2020/0288634 A1* | 9/2020 | Hasegawa | A01D 34/78 |

FOREIGN PATENT DOCUMENTS

| | | | | |
|---|---|---|---|---|
| EP | 3729946 A1 * | 10/2020 | | A01D 34/68 |
| JP | 2013123392 A | 6/2013 | | |
| WO | 2014119115 A1 | 8/2014 | | |
| WO | WO-2019058439 A1 * | 3/2019 | | A01D 34/68 |

* cited by examiner

APPARATUS AND METHOD FOR COOLING LAWNMOWER COMPONENTS

BACKGROUND

The disclosed subject matter relates to a lawnmower. More particularly, the disclosed subject matter relates to methods and apparatus that can shield the motor, electrical components and other components of the lawnmower from undesirable substance(s) and heat transfer generated by the motor and electronic components to the ambient environment.

Lawnmowers can be powered by a motor, such as an internal combustion engine or electric motor. The internal combustion engine or electric motor can be connected to one or more blades to rotate the blade(s) inside of a cutting chamber. Electric lawnmowers can rely on an external power source such as a wall outlet and can be connected to the wall outlet by an electrical cable (also referred to as an extension cord). Alternatively, electric lawnmowers can include an internal power supply such as a battery pack that includes one or more battery cells.

SUMMARY

Some embodiments are directed to a lawnmower that can include a deck, a blade, an electric motor, a battery pack, a housing and a fan. The deck can define a cutting chamber and include a top surface. The blade can be mounted in the cutting chamber to rotate about a blade axis. The electric motor can be mounted on the top surface of the deck, connected to the blade, and configured to rotate the blade in the cutting chamber. The battery pack can be in electrical communication with the motor. The housing can include a front end, a rear end, at least one air inlet, a first chamber, a second chamber and at least one housing air outlet. The air inlet can be located at the front end of the housing and adjacent to the top surface of the deck. The first chamber can contain the battery pack. The second chamber can contain the electric motor. The fan can be mounted in the housing and the housing can be configured such that, when the fan operates, air enters the housing air inlet at the front end of the housing, air flowing through the housing air inlet enters the first chamber, air flowing in the first chamber flows through the battery pack, air exiting the first chamber enters the second chamber and flows through the second chamber, air flowing in the second chamber flows through the motor in a downward direction of the lawnmower that extends along the blade axis, and air exiting the motor exits the housing through the at least one air outlet.

Some embodiments are directed to an electric lawnmower with convective cooling that can include a deck, a blade, an electric motor, a battery pack, a motor driver, and a convective cooling system. The deck can define a cutting chamber and include a top surface. The blade can be mounted in the cutting chamber to rotate about a blade axis. The electric motor can be mounted on the top surface of the deck, connected to the blade, and configured to rotate the blade in the cutting chamber. The motor driver can be in electrical communication with each of the motor and the battery pack. The motor driver can be configured to convert power from the battery pack into output power supplied to the electric motor. The convective cooling system can including a housing, a filter and a fan. The housing can be configured to contain the motor, the battery pack, and the motor driver. The housing can include a front end, a rear end, at least one air inlet and at least one air outlet. The air inlet can be located at the front end of the housing and adjacent to the top surface of the deck. The filter can be mounted in the housing and in fluid communication with the air inlet. The fan can be mounted in the housing and configured to be driven by the electric motor. The housing can be configured such that, when the electric motor drives the fan, air enters the air inlet at the front end of the housing, flows through the filter, flows through the battery pack, flows along the motor driver, flows through the electric motor in a downward direction of the electric lawnmower that extends along the blade axis, and exits the housing through the at least one air outlet sequentially in this order.

Some embodiments are directed to a method for cooling electrical components of a lawnmower that includes a deck, a blade, an electric motor, a battery pack, a motor driver and a housing. The blade can be rotatably mounted in a cutting chamber of the deck about a blade axis. The motor driver can be in electrical communication with the motor and the battery pack. The housing can contain the motor driver, the battery pack, and the electric motor, where the motor driver is configured to convert power from the battery pack into output power and to supply the output power to the electric motor. The method can include: sequentially, causing air to enter a front end of the housing at a location that is adjacent to a top surface of the deck; directing the air entering the front end of the housing to flow into a first chamber; directing air flowing in the first chamber to flow through a battery pack mounted in the first chamber; directing air exiting the first chamber to flow through a second chamber in the housing; directing air flowing in the second chamber to flow through the electric motor in a downward direction of the lawnmower that extends along a blade axis; and finally directing air exiting the second chamber to exit the housing.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 3 schematically illustrates certain features of the lawnmower of FIG. 1.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Electric lawnmowers can include electrical components, which can be adversely affected by dust, debris and liquids. Electric lawnmowers can include a protective housing that encloses the electrical components and is configured to shield the electrical motor and electronic components from dust, debris and liquids. However, during operation of the electric lawnmower, the electrical motor and electronic components can generate heat. This generated heat can also adversely affect the electrical motor and/or the electronic components if the generated heat is not transferred to the ambient environment. Thus, the protective housing should have a relatively high heat conductivity if the housing seals the electrical motor and electronic components from the ambient environment.

However, a sealed housing that also provides sufficient heat conduction to transfer heat generated by the electrical motor and electronic components to the ambient environment may be prohibitive due to the cost of the material, the weight and/or the size of the housing.

In contrast, a housing that includes at least one vent that can exhaust some, most or all of the heat generated by the electrical motor and electronic components can permit undesired intrusion of dust, debris and/or liquids into the housing.

Thus, there is a need for an electric lawnmower that can shield the electrical motor and the electronic components from dust, debris and liquids while also providing a cooling system that can advantageously transfer the heat generated by the electrical motor and the electronic components to the ambient environment. There is also a need for an electric lawnmower that can provide an advantageous heat transfer rate that can also draw an advantageously low amount of power from the electric motor and/or battery pack.

Figure 1:
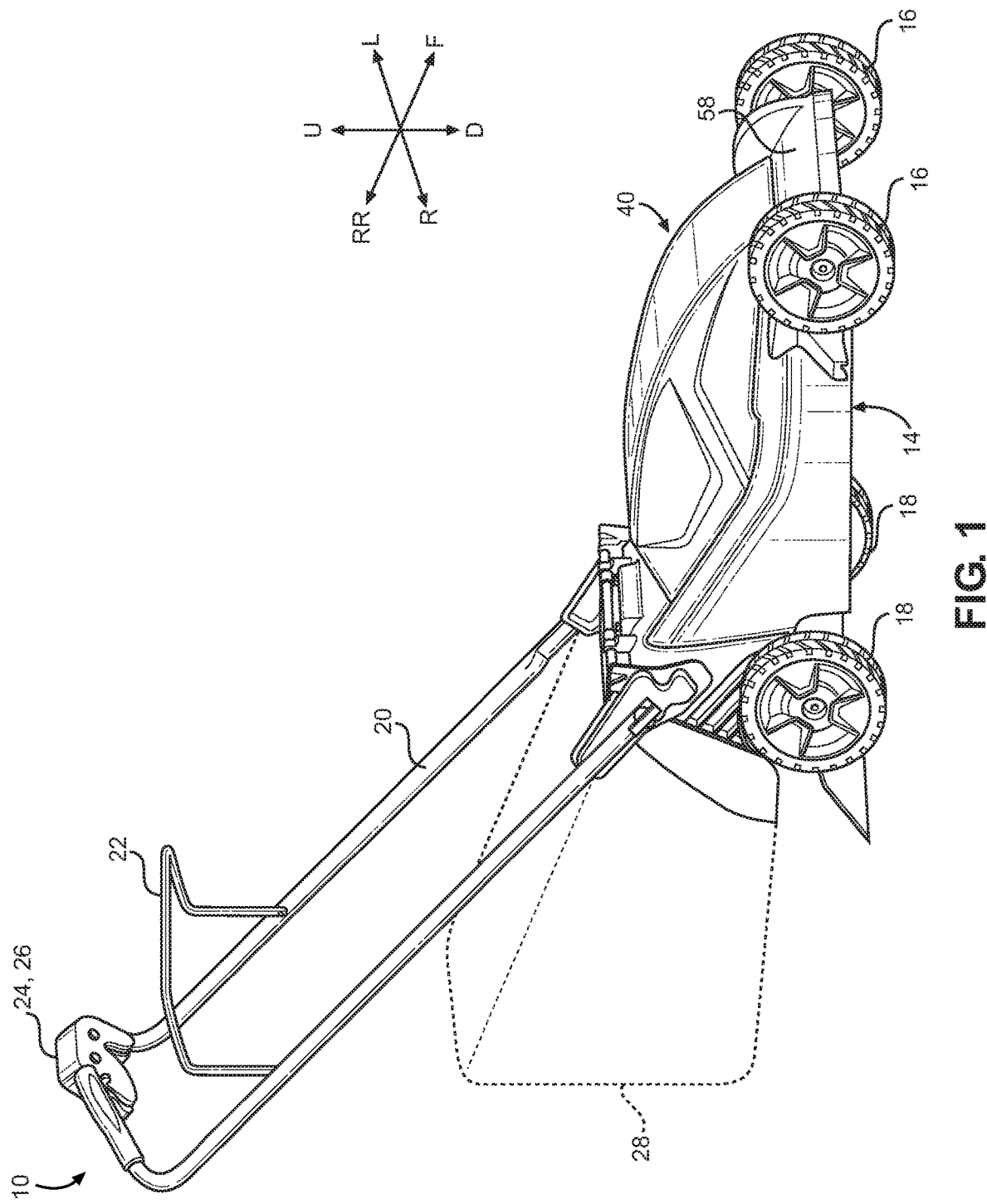
FIG. 1 is a perspective view of a lawnmower made in accordance with principles of the disclosed subject matter.
Figure 2:
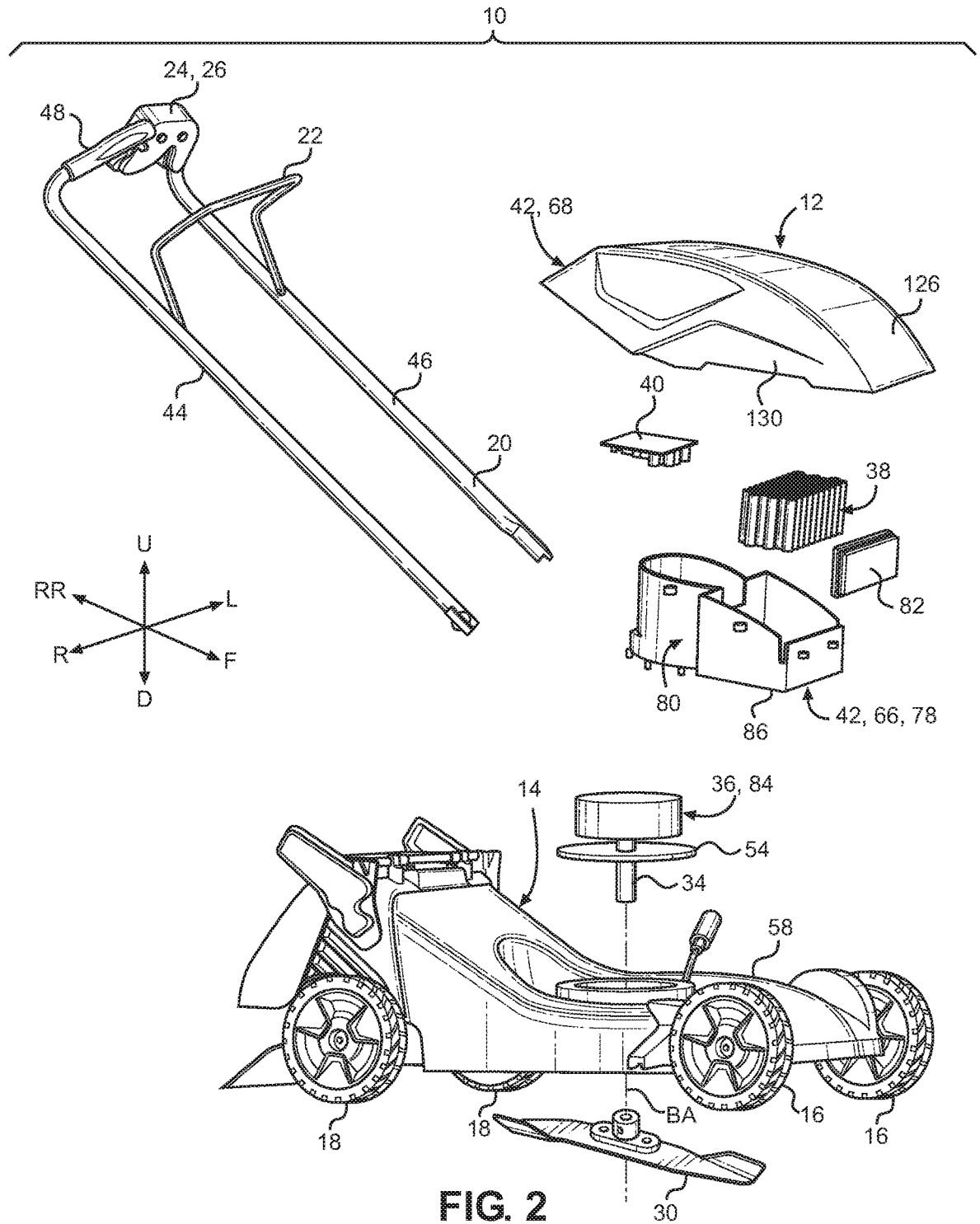
FIG. 2 is an exploded view of the lawnmower of FIG. 1.

FIG. 1 is a perspective view of an electric lawnmower 10 made in accordance with principles of the disclosed subject matter. FIG. 2 is an exploded perspective view of the lawnmower 10 of FIG. 1. The lawnmower 10 can include a power source assembly 12 that shields the electrical motor and electronic components from an undesirable level of intrusion of dust, debris and liquids. The power source assembly 12 can also be configured to transfer to the ambient environment an advantageous amount of the heat generated by the electrical motor and electronic components such that the temperature of the electrical motor and electronic components can be maintained at or below a predetermined threshold temperature. The power source assembly 12 also can provide an advantageous heat transfer rate that draws a low amount of power to operate a cooling system of the power source assembly 12.

Figure 3:
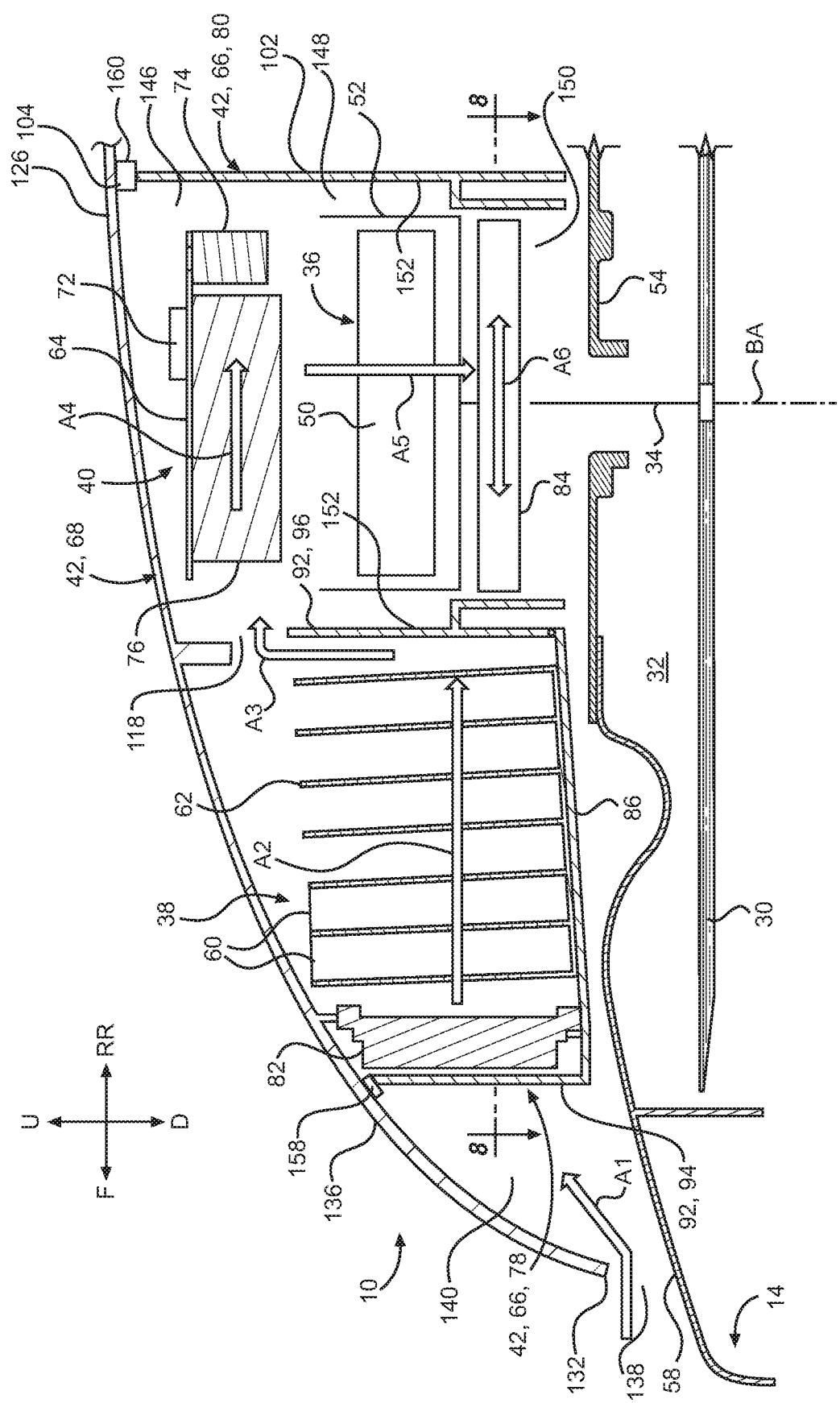
FIG. 3 is a partial cross-sectional view taken along line 3-3 of FIG. 6.

The lawnmower 10 can extend in a forward direction F, a rearward direction RR, a leftward direction L, a rightward direction R, a downward direction D and an upward direction U. Referring to FIGS. 2 and 3, the upward direction U and the downward direction D can be parallel to a blade rotational axis BA and can be opposite directions with respect to each other. The forward direction F and the rearward direction RR can be referred to as longitudinal directions of the lawnmower 10. The left direction L and the right direction R can be referred to as transverse directions of the lawnmower 10.

Referring to FIGS. 1 and 2, the lawnmower 10 can include a deck 14, a pair of front wheels 16, a pair of rear wheels 18, a handle 20, a blade brake lever 22, a first control assembly 24, a second control assembly 26 and a collection bag 28. The collection bag is shown in phantom in FIG. 1 and omitted from FIG. 2 for simplicity and clarity of the drawing figures. The deck 14 can also be referred to as a mower deck or as a cutter deck or as a cutter housing.

FIG. 3 is a partial cross-sectional view of the lawnmower 10 of FIG. 1 and schematically illustrates certain features of the lawnmower 10 as described below. Referring to FIGS. 2 and 3 the lawnmower 10 can include a blade 30 mounted in a cutting chamber 32 of the deck 14. A driveshaft 34 can be connected to each of the power source assembly 12 and the blade 30. FIG. 3 schematically illustrates the blade 30 and the driveshaft 34. The power source assembly 12 can be configured to rotate a blade 30 inside the cutting chamber 32. The driveshaft 34 can be referred to as a component of the power source assembly 12. Alternatively, the driveshaft 34 can be referred to as a component that is connected to and driven by the power source assembly 12.

The power source assembly 12 can include an electric motor 36, a battery pack 38, a motor driver 40 and a housing 42. FIGS. 2 and 3 schematically illustrate the electric motor 36. As described in detail below, the motor driver 40 can be configured to convert power from the battery pack 38 into output power supplied to the electric motor 36.

Further features of the lawnmower 10 are described with reference to FIG. 1. An operator of the lawnmower 10 can use the handle 20 in order to guide the path of travel of the lawnmower 10. The handle 20 can include a right extension 44, a left extension 46 and a U-shaped portion 48 that connects to and extends from each of the extensions 44, 46. The handle 20 can support the blade brake lever 22 and the control assemblies 24, 26.

The blade brake lever 22 can be pivotally mounted on the handle 20. The blade brake lever 22 can also be configured to selectively permit the power source assembly 12 to drive the blade 30 and stop rotation of the blade 30. When in the position shown in FIG. 1, the blade brake lever 22 can prevent or stop rotation of the blade 30. When pivoted toward the U-shaped portion 48, the blade brake lever 22 can permit rotation of the blade 30.

The first control assembly 24 can be mounted on the handle 20 in any appropriate position and orientation on the handle 20 that can facilitate interaction with an operator of the lawnmower 10. In the exemplary embodiment of FIG. 1, the first control assembly 24 can be mounted on the upper portion of the right extension 44 of the handle 20. The first control assembly 24 can be configured to actuate one or more operational features of the lawnmower 10. In one exemplary embodiment, the first control assembly 24 can be configured to cooperate with the blade brake lever 22 in order to signal the electric motor 36 to rotate the blade 30.

Figure 4:
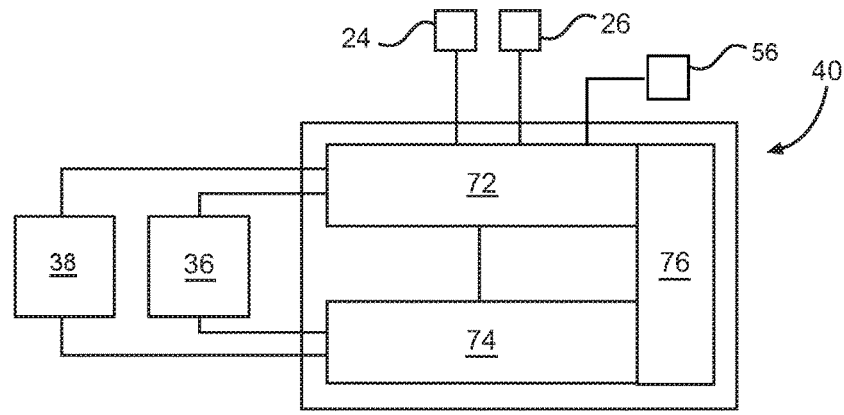
FIG. 4 is a schematic view of an electrical circuit of the power source assembly of the lawnmower of FIG. 1.

Alternatively, or additionally, the first control assembly 24 can be electrically connected to the power source assembly 12. FIG. 4 schematically illustrates the first control assembly 24 in electrical communication the motor driver 40 of the power source assembly 12. In this exemplary embodiment, first control assembly 24 can include a switch configured to selectively place the power source assembly 12 in an "ON" state in which the motor driver 40 is electrically connected to the battery 38 or in an "OFF" state in which the motor driver 40 is electrically disconnected from the battery 38.

The second control assembly 26 can be mounted on the handle 20 in any appropriate position and orientation on the handle 20 that can facilitate interaction with an operator of the lawnmower 10. In the exemplary embodiment of FIG. 1, the second control assembly 26 can be mounted on the U-shaped portion 48 of the handle 20. In an exemplary embodiment, the second control assembly 26 can include a switch or knob that is electrically connected to the power source assembly 12 and configured to adjust the rotational speed of the electric motor 36 of the power source assembly 12. The second control assembly 26 can include the switch configured to selectively place the power source assembly 12 in the "ON" state or in an "OFF" state (Instead of having this feature in the first control assembly 24). Alternatively, or additionally, the second control assembly 26 can include a switch or knob configured to selectively electrically (or mechanically) connect a self-propulsion assembly to the power source assembly 12. The self-propulsion assembly can include an electric drive motor that can apply torque to one or both of the rear wheels 18. The second control system 26 can be configured to adjust the speed at which the self-propulsion assembly propels the lawnmower 10 along the ground.

Referring to FIGS. 1 and 3 collectively, the collection bag 28 can be in communication with the cutting chamber 32 to collect vegetation that is cut by the blade 30. The collection bag 28 can be connected to the deck 14 at a side of the lawnmower 10 or at the rear of the lawnmower 10. In the exemplary embodiment of FIG. 1, the collection bag 28 is connected to the deck 14 at the rear of the lawnmower 10. The collection bag 28 can be removably mounted to the deck 4 in order to empty the cut vegetation from the collection bag 28. Alternatively, the lawnmower 10 can be operated without the collection bag 28.

The electric motor 36 can be a direct current motor or an alternating current motor. Referring to FIG. 3, the electric motor 36 can be a direct current outer rotor motor that includes an inner stator 50 and an outer rotor 52. The motor 36 can further include a mounting base 54. The inner stator 50 can be supported by and fixed against rotation to the deck 14 and/or a fixed portion of the housing 42 and/or the mounting base 54. The outer rotor 52 can be supported to rotate relative to the inner stator 50 and the mounting base 54. The mounting base 54 can be mounted on a top surface 58 of the deck 14 and connected to the deck 14 in any appropriate manner such as but not limited to mechanical fasteners. For example, the mounting base 54 can include a plurality of mounting holes spaced around the circumference of the mounting base 54. The mounting holes can include internal threads configured to engage external threads of a bolt that passes through a corresponding hole passing extending from the cutting chamber 32 and through the top surface 58 of the deck 12.

The electric motor 36 can include one or more sensors that provide the motor driver 40 with information regarding the temperature, rotational speed, power output, etc., of the electric motor 36.

The battery pack 38 can be configured to supply electricity to the electric motor 36. In some embodiments, the battery pack 38 can be permanently amounted in the housing 42. The battery pack 38 can include at least one battery cell 60 and a case 62 that houses the at least one battery cell 60. FIG. 3 schematically illustrates a pair of battery cells 60 mounted in respective receptacles of the case 62. The case 62 can space the battery cells 60 apart from each other in a predetermined pattern. The battery cell 60 can be a rechargeable battery such as but not limited a lithium ion battery or a nickel-metal hydride battery. The case 62 can be made from any appropriate electrically insulating material such as but not limited to electrically insulating plastics, ceramics, or insulated metal.

As schematically illustrated in FIG. 4, the power source assembly 12 can include a charging port 56 that is in electrical communication with the battery pack 38 or via the motor driver 40. The charging port 56 can be configured to receive a connector from an external power supply in order to recharge the battery cells 60 of the battery pack 38.

The battery pack 38 can include one or more sensors and electronic control units in electrical communication with the motor driver and each of the battery cells 60. The sensors and/or the electronic control unit can provide the motor driver with information regarding the temperature and remaining charge of the battery pack 38.

Figure 5:
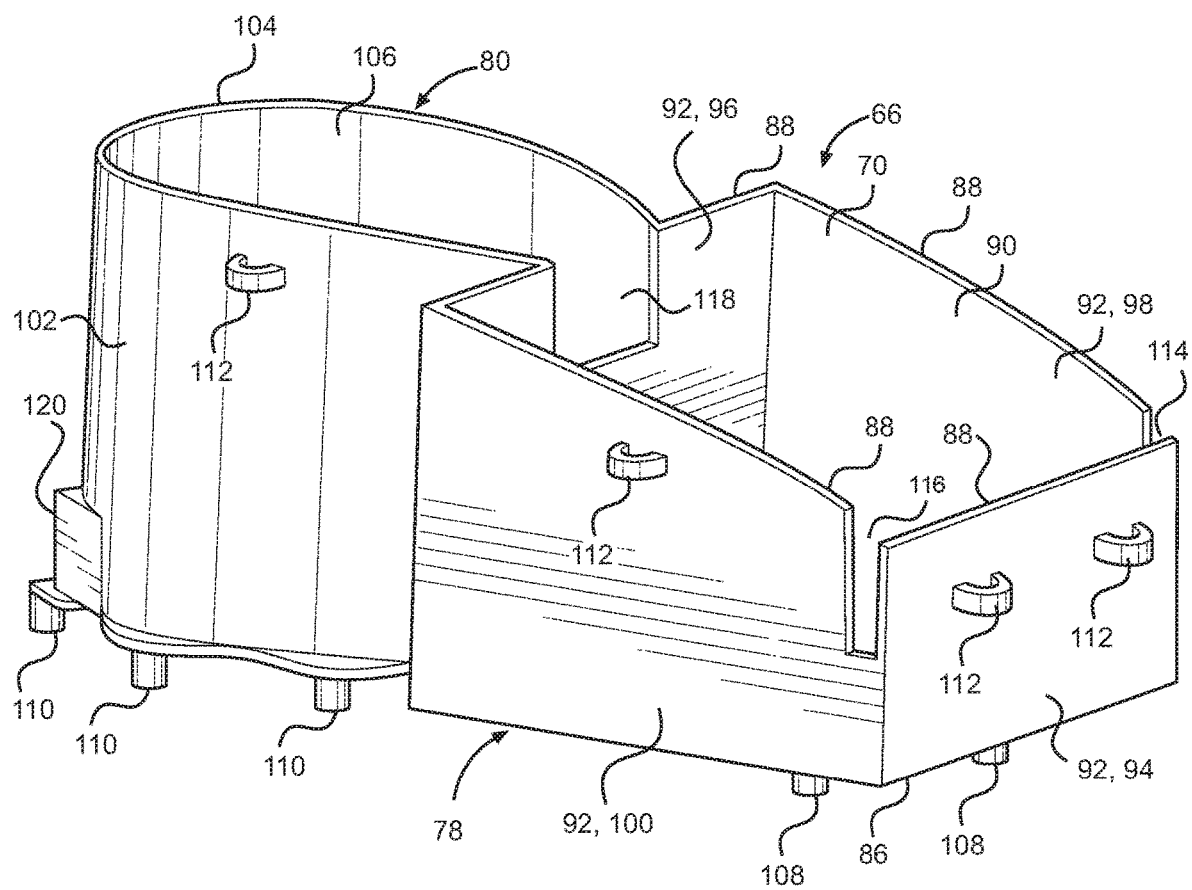
FIG. 5 is a perspective view of a housing base of the lawnmower of FIG. 1.
Figure 6:
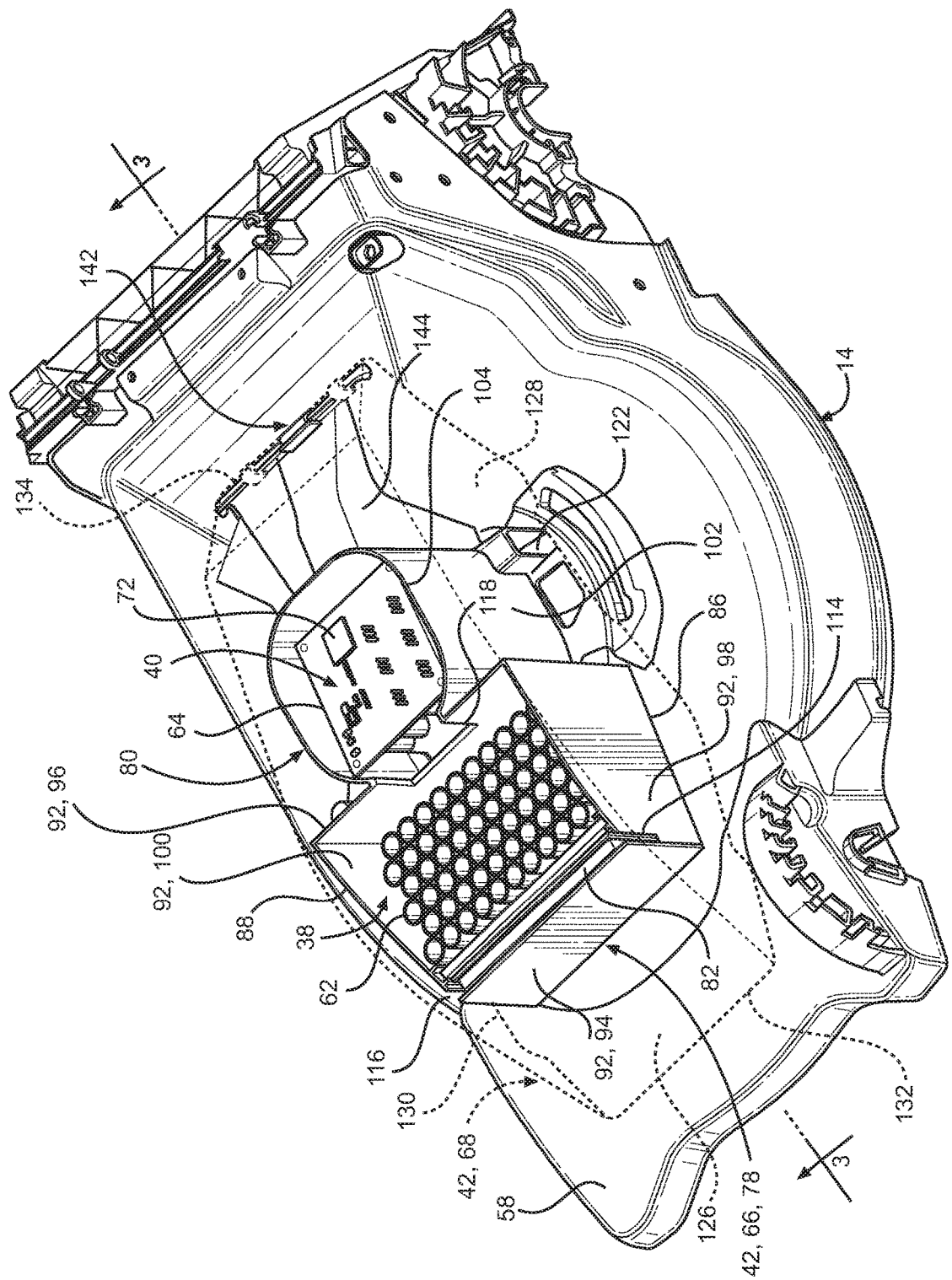
FIG. 6 is a perspective view of a deck and a power source assembly of the lawnmower of FIG. 1 with a top cover of the housing shown in phantom and showing internal components of the power source assembly.

Referring to FIGS. 5 and 6, the motor driver 40 can include a printed circuit board 64 and a plurality of electrical and/or electronic components, such as but not limited to a memory device, a electronic control device, a power field effect transistor, capacitor(s), transistor(s), and circuit lines mounted on the printed circuit board 64. The motor driver 40 can be configured to regulate the supply of electricity from the battery pack 38 to the electric motor 36. When electricity from the battery pack 38 energizes the electric motor 36, the electric motor 36 can rotate the driveshaft 34, which rotates the blade 30 in the cutting chamber 32.

The motor driver 40 can be configured to monitor the operational conditions of the electric motor 36 and the battery 38. The motor driver 40 can be configured to control the voltage or current output by the battery 38 based on the operational conditions of the motor 36 and the battery pack 38.

The motor driver 40 can also be configured to amplify the voltage or current output by the battery 38, and to supply the amplified voltage or current to the electric motor 36 based on one or more inputs to the control assemblies 24, 26 by the operator of the electric lawnmower 10. Further, the motor driver 40 can be configured to supply the amplified voltage or current to the electric motor 36 based on one or more operational parameters of the electric motor and/or the battery pack 38.

FIGS. 3 and 4 schematically illustrate the motor driver 40. The motor driver 40 can be in electrical communication with each of the first control assembly 24, the second control assembly 26, the electric motor 36, the battery pack 38 and the charging port 56. The motor driver 40 can include a controller 72, an amplifier 74 and a heat sink 76.

The controller 72 can be in electrical communication with the first control assembly 24, the second control assembly 26, the electric motor 36, the battery pack 38 and the amplifier 74. The controller 72 can be referred to as an electronic control unit ("ECU") or as a central processing unit ("CPU") or as a microcontroller. The controller 72 can be configured with hardware, with or without software, to perform the assigned task(s). The controller 72 can include or be electrically connected to any appropriate memory device that can store and retrieve programs and/or data for use by the controller. The controller 72 can be configured to signal the amplifier 74 to initiate, adjust or terminate supply of voltage or current from the battery pack 38 to the electric motor 36 based on inputs received from the control assemblies 22, 24, the battery pack 38 and the motor 36. The controller 72 can be configured to regulate the charging of the battery cells 60.

The amplifier 74 can be any appropriate electrical device or electronic circuit that can increase the voltage or the current supplied by the battery 38 and transmit the amplified voltage or current to the electric motor 36. The controller 72 can be configured to signal the amplifier 74 to amplify the voltage or current based on any appropriate parameter(s) such as but not limited to state of charge of the battery cell(s) 60, state of health of the battery cell(s) 60, battery temperature, motor temperature, and operator requested motor speed.

The controller 72 and the amplifier 74 can generate heat during operation of the electric lawnmower 10. The heat sink 76 can be thermally coupled to each of the controller 72 and the amplifier 74 such that the heat sink 76 absorbs at least some of the heat generated by the controller 72 and the amplifier 74. The heat sink 76 can be configured to transfer at least some of the heat absorbed from the controller 72 and the amplifier 74 to the ambient environment.

The housing 42 can shield the electric motor 36, the battery pack 38 and the motor driver 40 from dust, debris and liquids. The housing 42 can be made from any appropriate material such as but not limited to metal, plastic, ceramics, or a combination thereof. The housing 42 can include a base 66 and a top cover 68.

Figure 7:
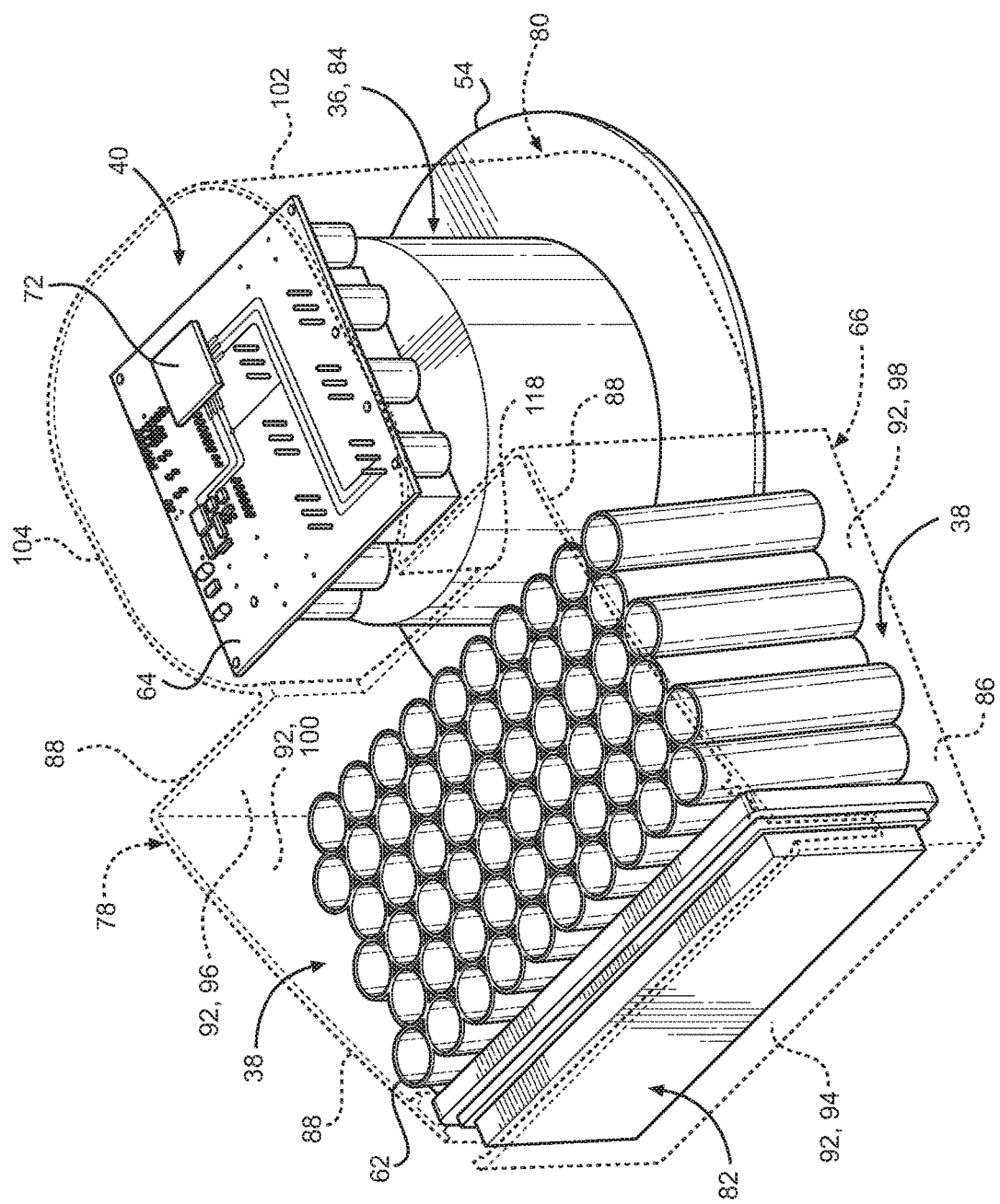
FIG. 7 is a perspective view of the power source assembly for the lawnmower of FIG. 1 with the top cover of the housing removed and a base of the housing shown in phantom and showing internal components of the power source assembly.

FIG. 5 is a perspective view of the base 66. The base 66 can include a first receptacle 78 and a second receptacle 80. Referring to FIG. 3, the first receptacle 78 can be located between a front end of the housing 42 and the blade axis BA. The second receptacle 80 can be located between the first chamber 78 and the rear end of the housing 42. An air filter 82 and the battery pack 38 can be located in the first receptacle 78. Each of the motor driver 40, the electric motor 36 and a fan 84 can be located in the second receptacle 80. FIGS. 2 and 7 show a cylindrical shape that schematically represents an assembly that includes the fan 84 and the electric motor 36. FIG. 3 schematically illustrates electric motor 36 and the fan 84. The electric motor 36 and the fan 84 are obstructed from view in FIG. 6 by the base 66.

Figure 8:
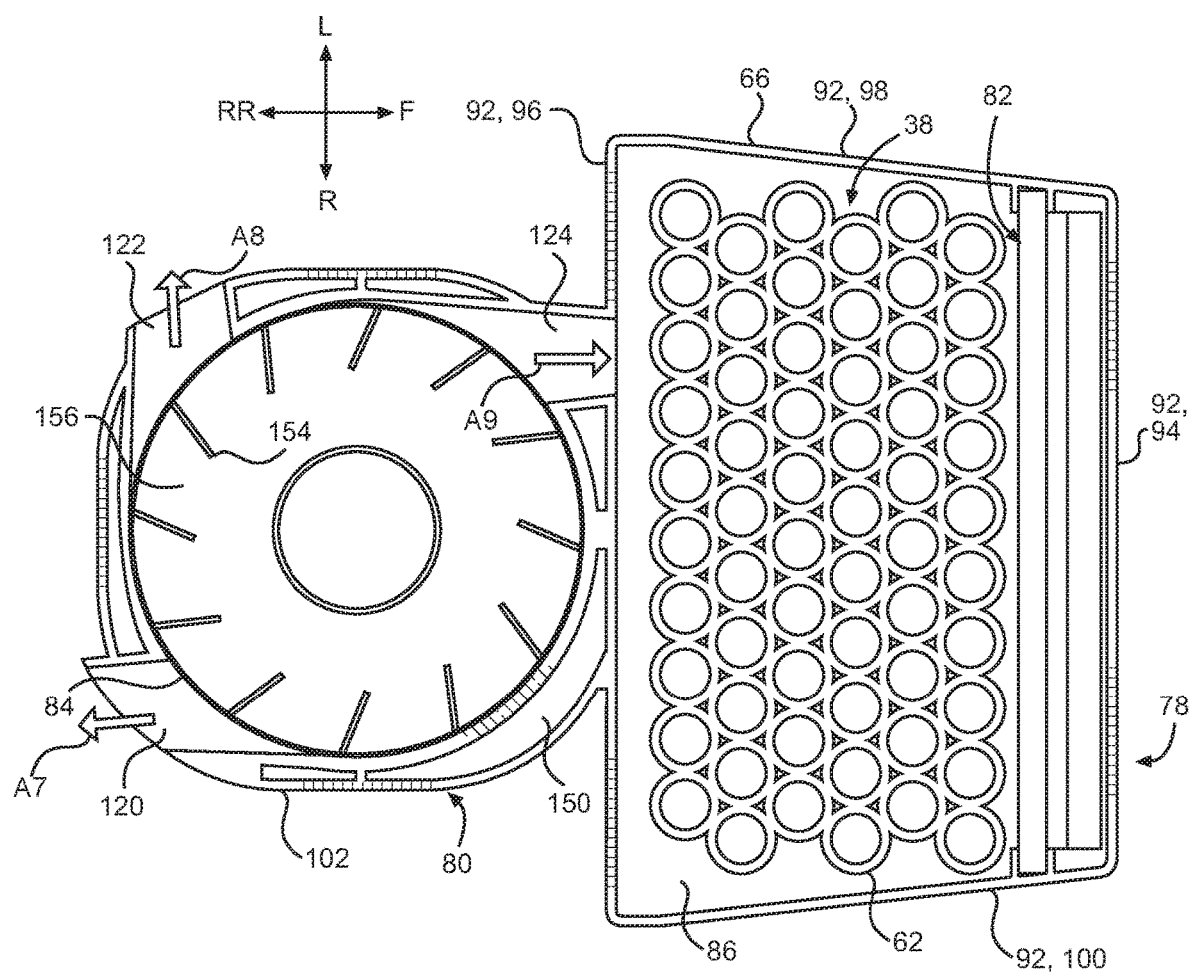
FIG. 8 is a cross-sectional view taken along line 8-8 of FIG. 3 showing the fan and the air outlets.

Referring to FIGS. 3, 5 and 8 collectively, the first receptacle 78 can include a bottom wall 86 and a first peripheral wall 92 that extends from the bottom wall 86 and terminates at a first top edge 88. The bottom wall 86 can be spaced away from and oppose the top surface 58 of the deck 14. The first top edge 88 can define a first top opening 70.

The first receptacle 78 can have any appropriate shape. For example, the first receptacle 78 can have a polygonal shape that defines the top opening 70 as having a corresponding polygonal shape. The first peripheral wall 92 can include a front wall 94, a rear wall 96, and a pair of side walls 98, 100. The rear wall 96 can be spaced away from and oppose the front wall 94. The side walls 98, 100 can be spaced away from each other. The side walls 98, 100 can be connected to and extend from each of the front wall 94 and the rear wall 96. The walls 94, 96, 98, 100 can be connected to and extend from the bottom wall 86 to the first top edge 88.

The second receptacle 80 can include a second peripheral wall 102 that extends from and is connected to the rear wall 96 of the first receptacle 78. The second peripheral wall 102 and the rear wall 96 can define the second receptacle 80. The peripheral wall 100 can terminate at a second top edge 104. The second peripheral wall 102 can have any appropriate shape. For example, the second peripheral wall 102 can have a plurality of straight wall portions that are connected to each other by a plurality of curved wall sections. The peripheral wall 102 can terminate at a second top edge 104. The second top edge 104 can define a second top opening 106.

The base 66 can include a plurality of first supports 108 spaced along the bottom wall 86 of the first receptacle 78 and a plurality of the second supports 110 along the bottom end of the second receptacle 80. The first supports 108 can engage the tip surface 58 of the deck 14. The first supports 108 can space the bottom wall 86 away from the top surface 58 of the deck 14. The second supports 110 can engage the top surface of the mounting base 54 of the electric motor 36. Some or all of the second supports 110 can be connected to the mounting base 54 in any appropriate manner such as but not limited to threaded fasteners, resilient clips, staking, adhesives, welding, or any combination thereof.

The base 66 can include a plurality of mounting tabs 112 spaced around the peripheral walls 92, 102. The top cover 68 can include a corresponding plurality of projections that protrude from a bottom surface of the top cover 68 and engage a respective one of the mounting tabs 112. The projections can rest on or be connected to the mounting tabs 112 in any appropriate manner.

As will be described below, the base 66 and the top cover 68 can direct air flowing in the housing 42. Referring to FIG. 5, the base 66 can include a pair of chamber air inlets 114, 116 and an intermediate opening 118.

The chamber air inlets 114, 116 can be located in the first receptacle 78 and configured as openings in the side walls 98, 100 that extend along the front wall 94 and extend from the first top edge 88 to a position on the side walls 98, 100 that is between the first top edge 88 and the bottom wall 86.

The intermediate opening 118 can pass through the rear wall 96. The intermediate opening 118 can be in fluid communication with each of the first receptacle 78 and the second receptacle 80. That is, the intermediate opening 118 can be referred to as a chamber air outlet for the first receptacle 78 and as a chamber air inlet for the second receptacle 80. The intermediate opening 118 can extend from the first top edge 88 to a position on the side walls 98, 100 that is between the first top edge 88 and the bottom wall 86.

The portions of the top edge 88 that extends along the side walls 98, 100 can be inclined relative to the plane of the bottom wall 86 such that the top edge 88 adjacent to the rear wall 96 is spaced away from the top surface 58 of the deck by a distance that is greater than a distance by which the portion of the top edge along the front wall 94 is paced away from the top surface 58 of the deck 14 with respect to the upward direction U of the lawnmower 10. Thus, the intermediate outlet 118 can be located at a position in the upward direction U that is higher than an elevation of the chamber air inlets 114, 116 with respect to the top surface 58 of the deck 14.

FIG. 8 is a cross-sectional view taken along line 8-8 of FIG. 3. The base 66 can include a plurality of air outlets 120, 122, 124 that are spaced around the perimeter of the second receptacle 80. FIG. 5 shows the first air outlet 120 and FIG. 6 shows the second air outlet 122. The air outlets 120, 122, 124 can be located adjacent to the bottom of the second receptacle 80. The first air outlet 120 can extend from the second receptacle 80 towards the rear end of the housing 42 in the rearward direction RR of the lawnmower 10. The second air outlet 122 can extend from the second receptacle 80 towards the left side of the housing 42 in the leftward direction L of the lawnmower 10. The third air outlet 124 can extend from the second receptacle 80 towards the front end of the housing 42 in the forward direction F of the lawnmower 10.

The top cover 68 can extend across the first receptacle 78 and the second receptacle 80. The top cover 68 can close the first and second top openings 90, 106. Thus, the top cover 68 and the receptacles 78, 80 can collectively form a first chamber that contains the battery pack 38 and the air filter 82 and a second chamber that contains the electric motor 36, the motor driver 40 and the fan 84.

The top cover 68 can include a top wall 126 and a pair of side walls 128, 130. FIG. 6 shows the top wall 126 and the left side wall 128 in phantom. FIG. 2 shows the top wall 126 and the right side wall 130.

The top wall 126 can define a top surface of the housing 42. The top wall 126 can terminate at a front edge 132 and a rear edge 134. The front edge 132 can correspond to a front end of the housing 42 and the rear edge 134 can correspond to a rear end of the housing 42. Referring to FIG. 3, the front edge 132 can be spaced away from and extend along the top surface 58 of the deck 14 in the left and right directions L, R of the lawnmower 10.

The top wall 126 can include an inclined portion 136 that is inclined relative to the top surface 54 of the deck 14 in the rearward direction RR of the lawnmower 10 toward the rear end of the housing 42.

The side walls 128, 130 of the top cover 68 can be spaced apart from each other. The side walls 128, 130 can be connected to extend away from the top wall 126 in the downward direction D of the lawnmower 10. Each of the side walls 128, 130 can extend toward the top surface 58 of the deck 14. The first and second receptacles 78, 80 can be located between the side walls 128, 130.

The lawnmower 10 can include an air inlet 138 and a front air chamber 140. The air inlet 138 can be located at the front end of the housing 42 and adjacent to the top surface 58 of the deck 14. The air inlet 138 can extend from the front edge 132 to the top surface 58 of the deck 14. The top wall 126 can extend from the air inlet 132 to the rear end of the housing 42.

The front air chamber 140 can extend from the air inlet to the front wall 94 of the base 66 and between the inclined portion 136 of the top cover 68 and the front wall 94 of the base 66. That is, the front wall 94 of the first receptacle 78 can be spaced way from the air inlet 138 in the rearward direction RR of the lawnmower 10. The first receptacle 78 can be in fluid communication with the air inlet 138 via the front air chamber 140 and the chamber air inlets 114, 116. The inclined portion 136 of the top wall 126 can extend from the air inlet 138 and across the battery pack 38 in the rearward direction RR.

The top cover 68 can be movably or removably connected to the base 66 to permit access to the electric motor 36, the battery pack 38, the motor driver 40 and the fan 84 for service, repair and replacement. Referring to FIG. 6, the housing 42 can further include a hinge assembly 142 that pivotally connects the top cover 68 to the base 66. The hinge assembly 142 can connect the rear end of the top wall 126 of the top cover 68 to an extension 144 of the base 66.

The top cover 68 can be pivoted between a closed position and an opened position. FIG. 6 shows the battery cover 80 in the closed position. The top cover 68 can be secured in the closed position so that the base 66 and the top cover 68 enclose the electric motor 36, the battery pack 38, the motor driver 40 and the fan 84. The top cover 68 can be secured to the mounting tabs 112 in the closed position as discussed above.

Each of electric motor 36, the battery 38, the controller 72 and the amplifier 74 can generate heat during operation of the lawnmower 10. If the transfer rate of the heat that is generated is less than the rate at which heat is generated by the electric motor 36, the battery 38, the controller 72 and the amplifier 74, then some or all of the component can enter an overheat condition in which the desired performance of one or more of the electric motor 36, the battery 38 and the motor driver 40 can be adversely affected. For example, the motor driver 40 can include one or more electronic components that can be adversely affected by an increase in temperature. The operational efficiency of the electric motor 36 and/or the battery 38 can decrease as the respective motor temperature and the battery temperature increases.

The housing 42 can be configured to enclose the electric motor 36, the battery 38 and the motor driver 40 in order to shield the electric motor 36, the battery 38 and the motor driver 40 from dust, debris and fluids. However, the housing 42 may limit the heat transfer rate between the ambient environment and each of the electric motor 36, the battery 38 and the motor driver 40 if a conductive heat transfer process is relied on because the conductive heat transfer rate provided by the housing 42 might not be sufficient to maintain the electric motor 36, the battery 38 and/or the motor driver 40 at or below a desired operating temperature.

In contrast, the power source assembly 12 can implement a convective heat transfer process (also referred to as a forced cooling process) that can advantageously increase the heat transfer rate between the ambient environment and each of the electric motor 36, the battery 38 and the motor driver 40. The power source assembly 12 can include a convective cooling system that provides sufficient cooling of the electric motor 36, the battery pack 38 and the motor driver 40 such that the power available to drive the blade 30 can be enhanced. As will be described in further detail below, the housing 42 can be configured to provide one or more structure(s) of the convective cooling system. The convective cooling system can enhance cooling, reduce thermal degradation and improve power output and operational performance of the electric motor 36, the battery pack 38 and the motor driver 40. The convective cooling system can include a relative orientation of the each of the electric motor 36, the battery pack 38, and the motor driver 40 that enhances the convective heat transfer between the electric motor 36, the battery pack 38 and the motor driver 40 and the circulating air. This relative orientation can limit the pressure drop(s) experienced by the air as it flows through the housing 42 and can further enhance the power output from the electric motor 36 to the blade 30.

In order to circulate cooling air through the housing 42, the interior of the housing 42 can be exposed to ambient environment. Thus, the housing 42 can include a predetermined airflow path that limits the amount of dust, debris, and liquids from the ambient environment that can enter the housing 42 via the convective cooling system. This can improve the maintenance cycle for each of the electric motor 36, the battery pack 38 and the motor driver 40.

Referring to FIG. 3, the power source assembly 12 can include a convective cooling system that incudes the fan 84, the air inlet 138 and at least one of the air outlets 120, 122, 124. The fan 84 can be located inside the housing 42. The air inlet 138 and the air outlets 120, 122, 124 can be formed in the housing 42 such that a sufficient flow of ambient air can efficiently enter and exit the housing 42 while preventing entry of dust, debris and liquids.

The fan 84 can be driven by the electric motor 36 and can be mounted on and driven by the driveshaft 34. The fan 84 can circulate ambient air through the power source assembly 12 in order to extract the heat generated by the power source assembly 12 by convective heat transfer and discharge the transferred heat to the ambient environment at such a rate that the performance of one or more components of the power source assembly 12 can be maintained at a desired level.

The second receptacle 80 can include a driver chamber portion 146, a motor chamber portion 148 and a fan chamber portion 150.

The driver chamber portion 146 can be in fluid communication with the first receptacle 78 via the intermediate opening 118. The driver chamber portion 146 can contain the motor driver 40 and support the motor driver 40. The motor driver 40 can be mounted to the second receptacle in the driver chamber portion 146 in any appropriate manner. The second receptacle 80 can support the motor driver 80 at a location on the blade axis BA such that the motor driver 40 is located at position from the top surface 54 of the deck 14 that is above the electric motor 36. That is, the motor driver 40 can mounted in the second receptacle 80 at a location that is spaced away from the electric motor 36 in the upward direction U of the lawnmower 10.

The motor chamber portion 148 can be in fluid communication with the driver chamber portion 146. The motor chamber portion 148 can contain the electric motor 36. The motor chamber portion 148 can include an interior peripheral surface 152 that is spaced away from the outer surface of the outer rotor 52 by a predetermined gap.

The fan chamber portion 150 can be in fluid communication with each of the motor chamber portion 146 and the air outlets 120, 122, 124. The fan chamber portion 150 can contain the fan 84. The fan chamber portion 150 can be located below the motor chamber portion 148 along the blade axis BA. That is, the fan chamber portion can be spaced away from the driver chamber portion 146 in the downward direction D of the lawnmower 10.

The fan chamber portion 150 of the second receptacle 80 can be cylindrical in shape. The air outlets 120, 122, 124 can be spaced apart about the circumference of the fan chamber 150. The air outlets 120, 122, 124 can be in fluid communication with the fan chamber 100. Some exemplary embodiments can include three air outlets 120, 122, 124 that are unequally spaced apart about the circumference of the fan chamber 100. However, any appropriate number and spacing of the air outlets 120, 122, 124 can be utilized to obtain the desired airflow through the housing 42.

The fan 84 can be configured in any appropriate manner such that the fan 84 provides a sufficient airflow rate through the housing 42 while limiting the power drawn from the electric motor 36 to drive the fan 94. Referring to FIG. 8, the fan 84 can be configured as a centrifugal fan 84 in which air enters along a central axis (that can coincide with blade axis BA) and exits the outer circumference of the fan 84.

The fan 84 can include a plurality of blades 154 and a lower plate 156. The lower plate 156 can be a flat annular plate. The fan 84 can further include an upper plate that is omitted from FIG. 8 in order to show the blades 154. The upper plate can be spaced apart from and identical to the lower plate 156. The blades 154 can be connected to and extend from each of the lower plate 156 and the upper plate.

The air inlet 138 can be an opening that is adjacent to the top surface 58 of the deck 14. As will be described in detail below, at least one of the electric motor 36 the battery pack 38 and the motor driver 40 can be located inside the housing 42 at a position that is spaced above the air inlet 138 in the upward direction U of the lawnmower 10 and positioned downstream from the air inlet 138. That is, the predetermined airflow path can include a portion that rises in the upward direction U of the lawnmower 10 away from the air inlet 138 and the top surface 58 of the deck 14. Thus, the convective cooling system can use gravity to prevent dust and liquid from entering the housing 42, or at least limit the intrusion of dust and liquid into the housing 42 to an acceptably low flow rate.

The housing 42 can be configured to route the air along a predetermined path such that air passing through housing 42 can efficiently cool each of the electric motor 36, the battery pack 38 and the motor driver 40 and also control pressure drop(s) through the housing 42 to limit the load on the fan 84. For example, the predetermined path can take advantage of the temperature and pressure gradients presented by each of the electric motor 36, the battery pack 38 and the motor driver 40 and such that the air flowing through each of the electric motor 36, the battery pack 38 and the motor driver 40 has a flow rate and heat absorbing capacity sufficient to transfer heat from each of the electric motor 36, the battery pack 38 and the motor driver 40 while also presenting a load to the fan 84 that does not adversely impact the power available from the electric motor 36 for driving the blade 30.

The electric motor 36, the battery pack 38 and the motor driver 40 are schematically illustrated in FIG. 3 to more clearly illustrate the features of the convective cooling system provided by the housing 42. The first receptacle 78, the driver chamber portion 146, the motor chamber portion 148 and the fan chamber portion 150 can be arranged according to the predetermined airflow path in order to limit the pressure drop through and between the first receptacle 78 and each of the chamber portions 146, 148, 150 and to enhance cooling efficiency for each of the electric motor 36, the battery pack 38 and the motor driver 40.

Referring to FIG. 3, when the fan 84 operates, air can enter the air inlet 138. Then the air can flow into the front air chamber 140 along the rearward direction RR of the lawnmower 10 as indicated by the arrow A1. Air in the front air chamber 140 can flow away from the top surface 58 of the deck 14 along the upward direction U of the lawnmower 10 as indcted by arrow A1. Then, the air can flow into at least one of the chamber air inlets 114, 116.

Air that passes through either of the chamber air inlets 114, 116 can enter the first receptacle 78. Air exiting either of the chamber air inlets 114, 116 can enter the air filter 82. The air filter 82 can collect dust, debris and/or liquids that might be entrained in the air flowing through the air filter 82. The air flowing through the filter 82 can flow along the left, right, upward, downward and rearward directions L, R, U, D, RR of the lawnmower 10.

Air exiting the filter 82 can flow into and fill the first receptacle 78 and flow through the battery pack 38 generally in the rearward direction RR of the lawnmower 10 as indicated by arrow A2. Air exiting the battery pack 38 can travel in the upward and rearward directions U, RR of the lawnmower 10 and enter the intermediate opening 118 as indicated by arrow A3.

Air exiting the intermediate opening 118 generally in the rearward direction RR of the lawnmower 10 can enter the second receptacle 80 as indicated by the arrow A3. For example, air exiting that intermediate opening 118 can flow through the driver chamber portion 146 generally in the rearward direction RR of the lawnmower 10. Air flowing in the driver chamber portion 146 can flow along the motor driver 40, and in particular along the heat sink 76, as indicated by the arrow A4. Air flowing along the motor driver 40 can subsequently enter the motor chamber portion 148 by flowing generally in along the downward direction D of the lawnmower 10. Alternatively, a portion of the air entering the second receptacle 80 via the intermediate opening 118 can bypass the motor driver 40 and flow toward the motor chamber portion 148.

Air flowing through the motor chamber portion 148 can flow through the stator 50 of the electric motor 36 along the downward direction D as indicated by the arrow A5. Further, air flowing through the motor chamber 148 can flow through the gap between the outer rotor 52 and the inner peripheral surface of the motor chamber portion 148. Air flowing through the motor chamber portion 148 along the downward direction D of the lawnmower 10 can enter the fan chamber portion 150 as indicated by the arrow A5.

Air flowing in the fan chamber portion 150 can enter the fan 84 generally in the downward direction D of the lawnmower 10. The fan 84 can redirect the air entering the fan to flow generally in radial directions of the fan 84, as indicated by the double-headed arrow A6, and in a circumferential direction of the fan chamber portion 150. Referring to FIG. 8, the fan 84 can direct the air to exit through any one of the air outlets 120, 122, 124. For example, the air can exit the first air outlet 120 generally along the rearward direction RR of the lawnmower 10 as indicated by the arrow A7. The air can exit the second air outlet 122 generally along the leftward direction L as indicated by the arrow A8. The air can exit the third outlet 124 generally along the forward direction F of the lawnmower 10 as indicated by the arrow A9.

Air exiting the third air outlet 124 can re-enter the first receptacle 78. For example, the rear wall 96 of the first receptacle 78 can include an opening at or near the bottom wall 86 of the first receptacle 78. The air flowing in the third air outlet 124 can flow into the first receptacle 78 via the opening in the rear wall 86 and flow through the first receptacle generally in the forward direction F of the lawnmower 10. The air re-entering the first receptacle 78 can either exit the first receptacle 78 via the air inlet 138 of the intermediate opening 118.

In summary, when the electric motor 36 drives the fan 84, air can enter the air inlet at the front end of the housing 42, flow through the filter 82, flow through the battery pack 38, flow along the motor driver 40, flow through the electric motor 36 in a direction that extends along the blade axis BA, and exit the housing 42 through at least one of the air outlet 120, 122, 124 sequentially in this order.

FIG. 3 shows that the fan 84 and the housing 42 configured to provide an exemplary method for cooling electrical components of the electric lawnmower 10. The method can include causing air to enter a front end (e.g., at the front edge 132) of the housing 42 at a location that is adjacent to the top surface 58 of the deck 14; directing the air entering the front end of the housing 42 to flow into the first chamber 78, 68; directing air flowing in the first chamber 78, 68 to flow through the filter 82 mounted in the first chamber 78; 68; directing air exiting the filter 82 to flow through the battery pack 38 mounted in the first chamber 78, 68; directing air exiting the first chamber 78, 68 to flow through a second chamber 80, 68 in the housing 42; directing air flowing in the second chamber 80, 68 to flow through the electric motor 36 along a downward direction (e.g., the downward direction D of the lawnmower 10) that extends along the blade axis BA; and directing air exiting the second chamber 80, 68 to exit the housing 42, possibly in this sequential order.

Referring to FIGS. 3, 5 and 6 collectively, the chamber air inlets 114, 116 and the intermediate opening 118 are spaced above the top surface 58 of the deck 14. Thus, dust, debris and/or liquid entrained in the air flowing through the front air chamber 140 is directed to flow generally in the upward direction U of the lawnmower 10. That is, gravity can slow the momentum of at least some of the entrained dust, debris and/or liquid such that at least some of the entrained dust, debris and/or liquid does not pass through the chamber air inlets 114, 116 and/or does not pass through the intermediate opening 118.

Referring to FIG. 3, the top cover 68 can be sealed along the first and second top peripheral edges 88, 104 in any appropriate manner. FIG. 3 schematically illustrates this sealed relationship at 158, 160. The sealed relationship between the top cover 68 and the top peripheral edges 88, 104 can reduce or prevent air leaking into either of the receptacles 78, 80 along any path other than the paths described above. For example, a flexible structure or an elastic structure can be connected to the bottom surface of the top cover 68 or onto the top peripheral edges 88, 104 that is compressed between the bottom surface of the top cover 68 and the top peripheral edges 88, 104 when the top cover 68 is closed onto the base 66. Alternate embodiments can include a pair of projections integrally formed on the bottom surface of the top cover 68 that form a channel into the top peripheral edges 88, 104 are positioned and form an interference fit with the first and second peripheral walls 92, 100.

As described above, the housing 42 can be configured to provide an efficient packaging of the electric motor 36, the battery pack 38 and the motor driver 40. This efficient packaging can also be conducive to a convective cooling system that can efficiently transfer heat from each of the electric motor 36, the battery pack 38 and the motor driver 40 and exhaust the transferred heat to the ambient environment such that an advantageously low amount of power is drawn from the electric motor 40 to operate the fan 94.

For example, the case 62 can be configured as shown in FIG. 6 such that the case 62 spaces the battery cells 60 apart from each other such that air can flow between adjacent battery cells 60. Further, the air flowing through the gap between the outer rotor 52 and the inner peripheral surface 152 of the motor chamber portion 148 can enhance the convective heat transfer between the electric motor 36 and the ambient air. Since the inner stator 50 is located within the outer rotor 52, air flow through the inner stator 50 can be improved as compared to an electric motor that includes an outer stator and an inner rotor.

As described above, the housing 42 can be configured with at least one air inlet 138 that is located below the chamber air inlets 114, 116 such that dust, debris and liquids must overcome the force of gravity in order to enter the first receptacle 78. Further, the housing 42 can include at least one air filter 82 that is configured to collect dust, debris, and/or liquids before the air flows along the battery pack 38, the motor driver 40 and the electric motor 36. Further still, the outer rotor 52 can shield the coils of the inner stator 50 from dust and/or debris that might flow into the motor chamber portion 148. Thus, the lawnmower 10 can include a convective cooling system that advantageously cools the electric motor 36, the battery [pack 38 and the motor driver 40 and also is advantageously water proof and dust proof.

Figure 9:
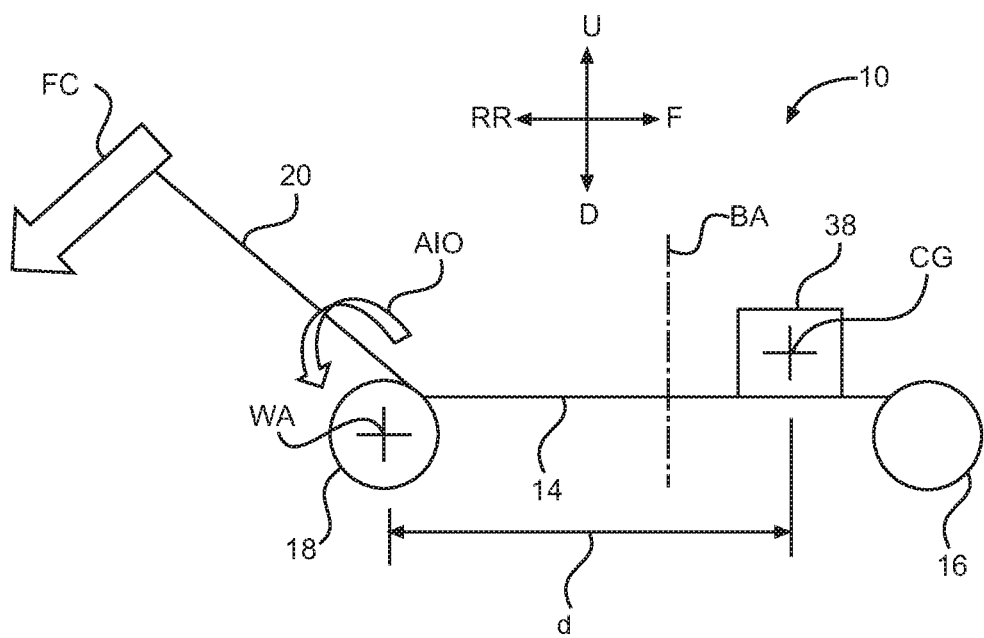
FIG. 9 is a schematic view of the lawnmower of FIG. 1 illustrating a handle balance feature of the lawnmower.

FIG. 9 is a schematic illustration of the lawnmower 10 showing forces that can act on the lawnmower 10. During operation of lawnmower 10, the operator 10 can apply a force to the handle 20 that has a component force FC shown in FIG. 9. Since the handle 20 extends away from the rear end of the lawnmower 10 in the rearward and upward directions RR, U of the lawnmower 10, the component force FC can create a moment about a wheel axis WA of the rear wheels 18. This moment can pivot the deck 14 about the wheel axis WA as indicated by the arrow A10. In addition to the cooling advantages discussed above, the position of the battery pack 38 in the first receptacle 78 can provide an advantageous weight balance for the lawnmower 10 that can reduce or prevent the moment created by the component force FC.

As shown in FIG. 3, the bottom wall 86 of the first receptacle 78 can be the only structure of the lawnmower 10 that extends between the battery pack 38 and the top surface 54 of the deck 14. Thus, the relatively heavy battery pack 38 can have its center of gravity CG placed close to the top surface 58 of the deck 14. This location can reduce or minimize the contribution by the center of gravity CG of the battery pack 38 to the moment created by the component force FC since the center of gravity CG is relatively close to the wheel axis WA with respect to the upward and downward directions U, D of the lawnmower 10.

Further, the first receptacle 78 can be positioned at a location on the deck 14 that is between the front wheels 16 and the blade axis BA. That is, the blade axis BA can be located between the battery pack 38 and the handle 20. This position of the first receptacle 78 can increase the distance d between the center of gravity CG of the battery pack 38 and the wheel axle WA of the rear wheels 18 as compared to the location on the deck where the blade axis BA passes through the battery pack 38. Thus, the battery pack 38 can provide a moment about the wheel axis WA that can more effectively counter or reduce the component force FC applied to the handle 20. This can enhance the operator's perceived level of stability of the lawnmower 10 and can enhance the operator's perceived level of comfort when using the lawnmower 10. Accordingly, in addition to providing an advantageous convective cooling performance, the lawnmower 10 can enhance the operator's perceptions of the usage of the lawnmower 10 in a positive manner.

While certain embodiments of the invention are described above, it should be understood that the invention can be embodied and configured in many different ways without departing from the spirit and scope of the invention.

For example, alternative embodiments can include a battery pack 38 that can be selectively removed from the housing 42 and placed in a charger assembly that is separate from the electric lawnmower 10.

Alternative embodiments can omit the filter 82. When the fan 84 operates, air that passes through either of the chamber air inlets 114, 116 can enter the first receptacle 78. Air flowing following in the first receptacle 78 can flow along the left, right, upward, downward and rearward directions L, R, U, D, RR of the lawnmower 10 to fill the first receptacle 78 and flow through the battery pack 38 generally in the rearward direction RR of the lawnmower 10 as indicated by arrow A2. Air exiting the battery pack 38 can travel in the upward and rearward directions U, RR of the lawnmower 10 and enter the intermediate opening 118 as indicated by arrow A3.

One exemplary embodiment includes a single air inlet 138 formed between the front end 132 and the top surface 58 of the deck 14. However, the housing 42 can include any appropriate number of air inlets 138 in order to achieve the desire airflow through the housing 42. Further, exemplary embodiments can include a front edge 132 of the top cover 68 that abuts the top surface 58 of the deck 14 and the top wall includes at least one opening that extends from the front edge 132 in the rearward direction RR of the lawnmower 10. Further, exemplary embodiments can include a top cover 68 that includes a front edge 132 that abuts the top surface 58 of the deck 14 and includes at least one opening that passes through the top wall 126 of the top cover 68 and is spaced away from the front edge 132.

Alternative embodiments can include a third air outlet 124 that directs air to exit the housing 42 in any appropriate direction. For example, the third air outlet 124 can extend under the bottom 86 of the first receptacle 78 in the frontward direction F and/or the leftward direction L of the lawnmower 10 such that air exiting the third air outlet 124 avoids the first receptacle 78.

Alternative embodiments can include a battery pack 38 that can be in direct electrical communication with the charging port 56.

Another alternative can include a battery pack 38 in which each battery cell 60 can be charged wirelessly. For example, the battery pack 38, or any appropriate structure of the electric lawnmower 10, can include an inductive coil that is in electrical communication with the battery cell(s) 60 directly or via the controller 72. When the inductive coil is aligned with a charger inductive coil that is in electrical communication with an external power supply, the inductive coil can receive electromagnetic energy from the charger inductive coil.

Electrical communication lines (not numbered) can connect the controller 72 to the first control assembly 24, the second control assembly 26, the electric motor 36, the battery pack 38 and the amplifier 74 and in any appropriate manner. Electrical communication can be either one-way communication or two-way communication and can be networked or not networked.

The battery pack 38 can include any appropriate number of battery cells 60 to achieve the desired output rating. The battery cells 60 can be connected in series in order to provide a desired voltage or current output. Alternatively, the battery pack 38 can include a plurality of cell groups where each cell group includes a plurality of battery cells 60 connected in series and the cell groups are connected to each other in parallel order to provide a desired voltage or current output. Further, the battery pack could be eliminated and power can be provided by a typical extension cord/wire connectable to a power outlet.

The deck 14 can be made from any appropriate material such as but not limited to steel, iron, ceramics, plastic or any combination thereof. The deck 14 can be formed by stamping sheet metal into the desired shape. Alternately, the deck 14 can be molded into the desired shape. The deck 14 can be a single homogenous unit, or the deck 14 can be formed from a plurality of part that are connected together into the desired shape by any appropriate structure or method such as but not limited to mechanical fasteners, adhesives and welding.

The blades 154 can be aligned with a radial direction of the lower plate 156. Alternatively, the blades 154 can be tilted with respect to the radial direction of the lower plate 156. In some embodiments, the fan 84 can rotate clockwise as viewed in FIG. 8, and the blades 154 can be tilted in the rotational direction of the fan 84. However, exemplary embodiments can include the blades 154 tilted opposite to the rotational direction of the fan 84.

The fan 84 can be integrated with the outer rotor 50 of the electric motor 36. However, alternate embodiments can include the fan 84 as a separate component from the electric motor 36 and either separately powered or powered by a transmission connected to motor 36. Alternate embodiments can include a fan 84 that has its own motor and is spaced away from the electric motor 36 and the driveshaft 34.

While the subject matter has been described in detail with reference to exemplary embodiments thereof, it will be apparent to one skilled in the art that various changes can be made, and equivalents employed, without departing from the scope of the invention.

What is claimed is:

1. A lawnmower comprising:
 a deck defining a cutting chamber and including a top surface;
 a blade mounted in the cutting chamber to rotate about a blade axis;
 an electric motor mounted on the top surface of the deck, connected to the blade, and configured to rotate the blade in the cutting chamber;
 a battery pack in electrical communication with the motor;
 a housing including,
  a front end and a rear end,
  at least one housing air inlet located at the front end of the housing and adjacent to the top surface of the deck,
  a first chamber containing the battery pack, the first chamber includes at least one chamber air inlet, at least one chamber air outlet, a top opening, and a top peripheral edge that surrounds the top opening, the at least one chamber air outlet is located between and spaced away from the front end of the housing and the blade axis, the at least one chamber air outlet is located at an elevation in a direction parallel to the blade axis that is higher than an elevation of the at least one chamber air inlet,
  a second chamber containing the electric motor,
  at least one housing air outlet, and
  a top cover that abuts the top peripheral edge and closes the top opening to air flowing through the at least one housing inlet; and
 a fan mounted in the housing, and the housing is configured such that, when the fan operates, air enters the at least one housing air inlet at the front end of the housing, the air flowing through the at least one housing air inlet enters the first chamber, the air flowing in the first chamber flows through the battery pack, the air exiting the first chamber enters the second chamber and flows through the second chamber, the air flowing in the second chamber flows through the motor in a downward direction of the lawnmower that extends along the blade axis, and the air exiting the motor exits the housing through the at least one housing air outlet.

2. The lawnmower according to claim 1, wherein the electric motor includes an outer rotor rotatably mounted on the deck, and an inner stator fixed relative to the deck and centered within the outer rotor.

3. The lawnmower according to claim 2, wherein the second chamber includes an inner peripheral surface, and
 the outer rotor is spaced away from the inner peripheral surface by a predetermined gap.

4. The lawnmower according to claim 1, wherein the at least one housing air outlet is a plurality of housing air outlets spaced about the perimeter of the second chamber, and
 at least one of the housing air outlets is located at the rear end of the housing.

5. The lawnmower according to claim 1, wherein the battery pack includes a plurality of battery cells, and the battery cells are mounted in the first chamber such that the battery cells are spaced apart from each other in a predetermined pattern.

6. The lawnmower according to claim 1, wherein the first chamber includes a second chamber air inlet that is spaced away from the top surface of the deck such that the second chamber air inlet is elevated relative to the at least one housing air inlet in the direction parallel to the blade axis.

7. The lawnmower according to claim 6, wherein
 the second chamber air outlet is in fluid communication with each of the first chamber and the second chamber.

8. The lawnmower according to claim 1, further comprising a handle mounted to a rear end of the deck and extending away from the rear end of the deck, wherein
 the battery pack is located in the housing at a position that is spaced away from the blade axis toward a front end of the deck such that the blade axis is located between battery pack and the handle.

9. The lawnmower according to claim 1, further comprising a motor driver in electrical communication with each of the electric motor and the battery pack, the motor driver configured to convert power from the battery pack into output power supplied to the motor,
 wherein the second chamber includes,
  a driver chamber portion in fluid communication with the first chamber, containing the motor driver, and supporting the motor driver,
  a motor chamber portion in fluid communication with the driver chamber portion, and containing the motor, and
  a fan chamber portion in fluid communication with each of the motor chamber portion and the at least one housing air outlet, the fan chamber containing the fan.

10. The lawnmower according to claim 9, wherein, when the fan operates, air entering the second chamber flows into the driver chamber portion before flowing into the motor chamber portion.

11. The lawnmower according to claim 9, wherein the driver chamber portion supports the motor driver at a location on the blade axis such that the motor driver is located at an elevation from the top surface of the deck that is above the electric motor.

12. The lawnmower according to claim 1, wherein
 the first chamber is located between the front end of the housing and the blade axis, and
 the second chamber is located between the first chamber and the rear end of the housing.

13. An electric lawnmower with convective cooling comprising:
 a deck defining a cutting chamber and including a top surface;
 a blade mounted in the cutting chamber to rotate about a blade axis;
 an electric motor mounted on the top surface of the deck, connected to the blade, and configured to rotate the blade in the cutting chamber;
 a battery pack;
 a motor driver in electrical communication with each of the motor and the battery pack, the motor driver configured to convert power from the battery pack into output power supplied to the electric motor; and
 a convective cooling system including,
  a housing including,
   a base mounted on the top surface of the deck, the base has a top peripheral edge, a first top opening, and at least one air outlet, wherein the motor, the battery pack, and the motor driver are mounted in the base, the top peripheral edge surrounds the first top opening, a top cover having a front end and a rear end, the top cover abuts the top peripheral edge and extends above the battery pack, the motor driver, and the motor, and
at least one air inlet located at the front end of the cover and adjacent to the top surface of the deck,
a filter mounted in the housing and in fluid communication with the at least one air inlet; and
a fan mounted in the base and configured to be driven by the electric motor, and the housing configured such that, when the electric motor drives the fan, air enters the at least one air inlet at the front end of the top cover, flows through the filter, flows through the battery pack, flows along the motor driver, flows through the electric motor in a downward direction of the electric lawnmower that extends along the blade axis, and exits the housing through the at least one air outlet sequentially in this order wherein
the cover closes the first top opening to air flowing through the at least one air inlet at the front of the top cover.

14. The electric lawnmower according to claim 13, wherein
the top cover includes a top surface that defines a top end of the housing,
the top surface of the top cover extends from the at least one air inlet and to the rear end of the housing,
the top surface of the top cover includes an inclined portion that is inclined relative to the top surface of the deck in a direction toward the rear end of the housing, and
the inclined portion extends from the at least one air inlet and across the battery pack.

15. The electric lawnmower according to claim 14, wherein
the base includes,
a first receptacle that includes the first top opening, wherein the filter and the battery pack are located in the first receptacle, and
a second receptacle that includes a second top opening, wherein each of the motor driver, the electric motor and the fan are located in the second receptacle, and
the top cover extends across the first receptacle and the second receptacle and closes the second top opening.

16. The electric lawnmower according to claim 15, wherein
the top cover terminates at a front edge that is spaced away from and extends along the top surface of the deck, and
the at least one air inlet extends from the front edge to the top surface of the deck.

17. The electric lawnmower according to claim 15, wherein
the first receptacle includes a front wall that terminates at the top peripheral edge,
the second receptacle includes a rear wall that terminates at the top peripheral edge,
the top cover includes a top wall connected to the top peripheral edge at each of the front wall and the rear wall such that the top wall forms a seal with the front wall and the rear wall.

18. The electric lawnmower according to claim 15, wherein the top cover includes,
a top wall that extends from the air inlet to the rear end of the housing, and the top wall is connected to the top surface of the deck along the rear end of the housing,
a pair of side walls spaced apart from each other and connected to extend away from the top wall, each of the side walls abuts the top surface of the deck, and
the top wall and the side walls cover the base.

19. The electric lawnmower according to claim 15, wherein the first receptacle includes,
a bottom wall spaced away from and opposing the top surface of the deck,
a front wall connected to and extending away from the bottom wall, wherein the front wall is spaced away from the at least one air inlet,
a rear wall connected to and extending away from the bottom wall, wherein the rear wall is spaced away from the front wall,
a pair of side walls connected to each of the bottom wall, the front wall and the rear wall, wherein the side walls are spaced apart from each other,
a chamber air inlet passing through a respective one of the side walls, and
an intermediate opening passing through the rear wall, wherein the intermediate opening is in fluid communication with each of the first receptacle and the second receptacle.

20. A lawnmower comprising:
a deck defining a cutting chamber and including a top surface;
a blade mounted in the cutting chamber to rotate about a blade axis;
an electric motor mounted on the top surface of the deck, connected to the blade, and configured to rotate the blade in the cutting chamber;
a battery pack in electrical communication with the motor;
a housing including,
a front end and a rear end,
at least one air inlet located at the front end of the housing and adjacent to the top surface of the deck,
a first chamber containing the battery pack,
a top peripheral edge defining a top opening at the first chamber,
a second chamber containing the electric motor,
at least one housing air outlet, and
a top cover that abuts the top peripheral edge and closes the top opening to air flowing through the at least one air inlet; and
a fan mounted in the housing and the housing configured such that, when the fan operates, air enters the at least one air inlet at the front end of the housing, air flowing through the at least one air inlet enters the first chamber, air flowing in the first chamber flows through the battery pack, air exiting the first chamber enters the second chamber and flows through the second chamber, air flowing in the second chamber flows through the motor in a downward direction of the lawnmower that extends along the blade axis, and air exiting the motor exits the housing through the at least one air outlet.

* * * * *